US012785470B2

(12) United States Patent
Komada

(10) Patent No.: US 12,785,470 B2
(45) Date of Patent: Nov. 3, 2026

(54) MOTOR COOLING DEVICE

(71) Applicant: TOYOTA JIDOSHA KABUSHIKI KAISHA, Toyota Aichi-ken (JP)

(72) Inventor: Hideaki Komada, Gotemba Shizuka-ken (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 165 days.

(21) Appl. No.: 18/892,642

(22) Filed: Sep. 23, 2024

(65) Prior Publication Data

US 2025/0132618 A1 Apr. 24, 2025

(30) Foreign Application Priority Data

Oct. 23, 2023 (JP) ................................ 2023-181917

(51) Int. Cl.
*H02K 1/20* (2006.01)
*H02K 9/19* (2006.01)

(52) U.S. Cl.
CPC ................ *H02K 1/20* (2013.01); *H02K 9/19* (2013.01); *H02K 2209/00* (2013.01)

(58) Field of Classification Search
CPC ............................... H02K 1/20; H02K 15/025
USPC ...................................................... 310/52–65
See application file for complete search history.

(56) References Cited

U.S. PATENT DOCUMENTS

| | | | | |
|---|---|---|---|---|
| 5,866,959 | A | 2/1999 | Le Flem | |
| 11,462,957 | B2 | 10/2022 | Dlala et al. | |
| 2018/0054095 | A1* | 2/2018 | Dlala | H02K 1/16 |
| 2022/0045576 | A1* | 2/2022 | Druant | H02K 3/24 |

FOREIGN PATENT DOCUMENTS

| | | | |
|---|---|---|---|
| JP | H07-322565 | A | 12/1995 |
| JP | 2008-312292 | A | 12/2008 |
| JP | 2017169249 | A * | 9/2017 |

OTHER PUBLICATIONS

JP-2017169249-A machine translation (Year: 2017).*

* cited by examiner

*Primary Examiner* — Oluseye Iwarere
*Assistant Examiner* — Minki Chang
(74) *Attorney, Agent, or Firm* — Dinsmore & Shohl LLP

(57) ABSTRACT

A motor cooling device includes: an oil passage, provided in a stator formed by laminating a plurality of steel plates, serving as a conduit for a cooling oil. Further, the oil passage is formed by a plurality of oil holes, which are formed in the steel plates and are overlapping with each other in a laminating direction of the steel plates, and the oil passage is formed by an offset collision wall formed by shifting the oil holes in a direction orthogonal to the laminating direction and overlapping the oil holes.

6 Claims, 4 Drawing Sheets

MOTOR COOLING DEVICE

CROSS-REFERENCE TO RELATED APPLICATION(S)

The present application claims priority to and incorporates by reference the entire contents of Japanese Patent Application No. 2023-181917 filed in Japan on Oct. 23, 2023.

BACKGROUND

The present disclosure relates to a motor cooling device.

U.S. Pat. No. 11,462,957 describes a motor cooling system in which an oil passage is formed in which cooling oil is introduced into a stator tooth. The oil passage has a constant shape in the direction in which the cooling oil flows.

SUMMARY

There is a need for providing present disclosure was made in view of the above, and an object thereof is to provide a motor cooling device capable of improving the cooling performance.

According to an embodiment, a motor cooling device includes: an oil passage, provided in a stator formed by laminating a plurality of steel plates, serving as a conduit for a cooling oil. Further, the oil passage is formed by a plurality of oil holes, which are formed in the steel plates and are overlapping with each other in a laminating direction of the steel plates, and the oil passage is formed by an offset collision wall formed by shifting the oil holes in a direction orthogonal to the laminating direction and overlapping the oil holes.

DETAILED DESCRIPTION

In a motor cooling device, it is desired to improve the cooling performance.

A motor cooling device according to an embodiment of the present disclosure will be described with reference to the drawings. In addition, components in the following embodiments include those which can be substituted and easily by those skilled in the art, or those which are substantially the same.

Embodiment

Figure 1:
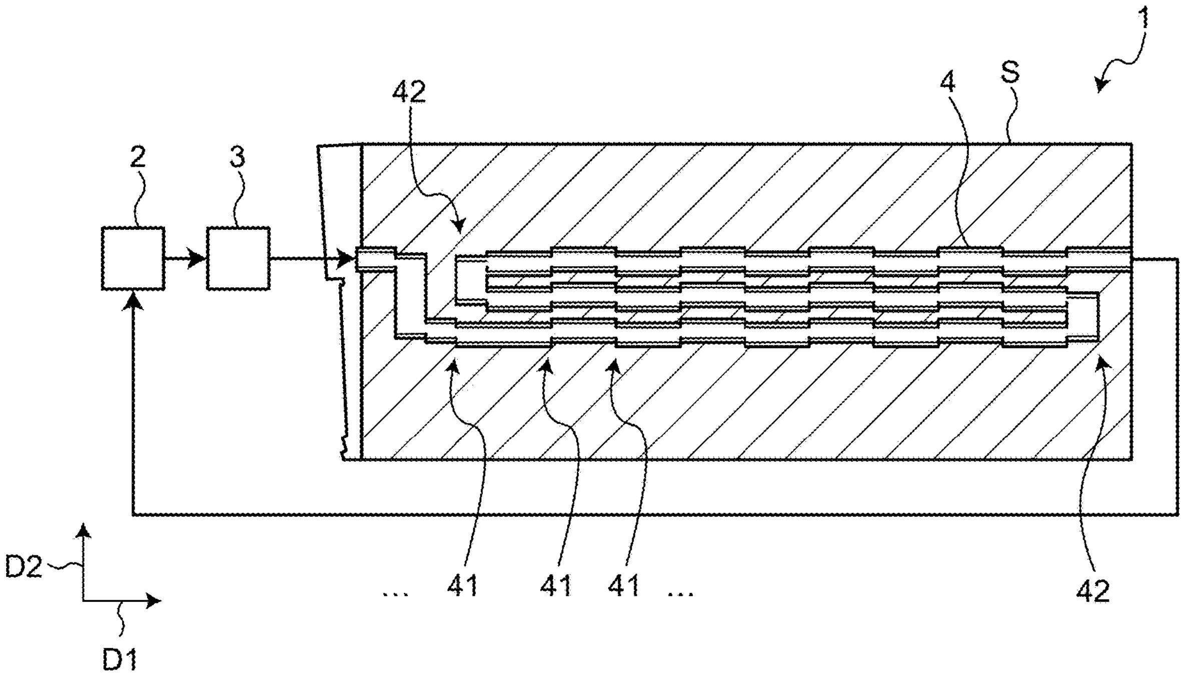
FIG. 1 is a cross-sectional view illustrating a schematic configuration of an oil passage of a motor cooling device according to an embodiment.

FIG. 1 is a cross-sectional view illustrating a schematic configuration of an oil passage of a motor cooling device according to an embodiment. FIG. 1 is a sectional view taken along the stacking direction D1 of the steel plate of the stator S formed by laminating a plurality of steel plates (lateral direction in FIG. 1), the vertical direction of FIG. 1 corresponds to the radial D2 around the rotational axis of the rotor. As illustrated in FIG. 1, the motor cooling device 1 includes an oil pan 2 for storing the cooling oil, an oil pump 3 for outputting the cooling oil at a predetermined hydraulic pressure, and an oil passage 4 serving as a conduit for the cooling oil.

The motor cooling device 1 outputs the cooling oil stored in the oil pan 2 at a predetermined hydraulic pressure by the oil pump 3, by the cooling oil circulates inside the oil passage 4 formed in the stator S, to cool the motor.

Figure 2:
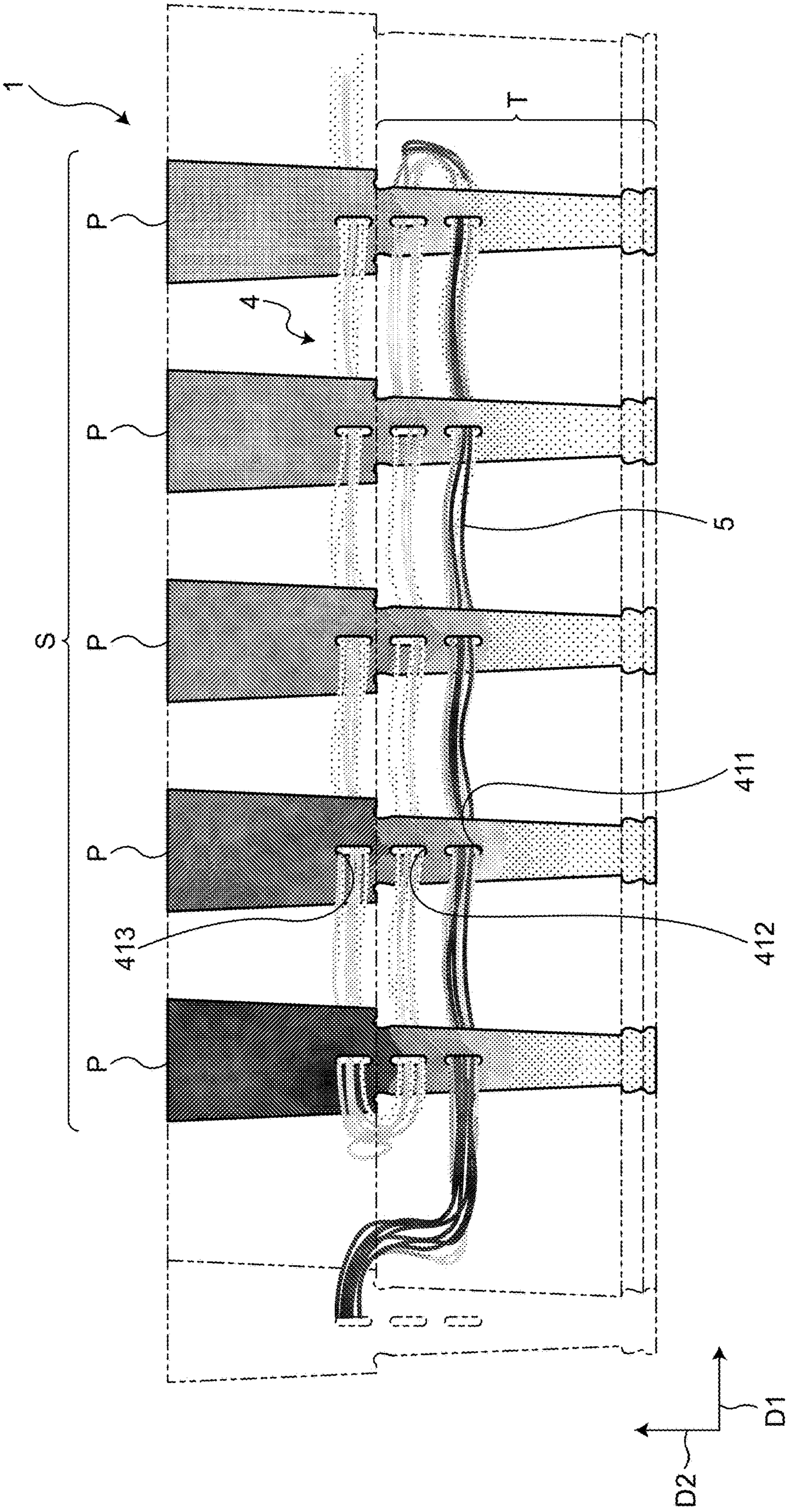
FIG. 2 is a diagram for explaining a steel plate of the motor cooling device illustrated in in FIG. 1.

FIG. 2 is a diagram for explaining a steel plate of the motor cooling device shown in FIG. 1. The stator S is made of a plurality of laminated steel plates P, in FIG. 2, for explaining the configuration of the steel plate P, it was illustrated only five steel plates P. Further, the steel plate P forms a shape of an annular around the rotation axis of the rotor, in FIG. 2, only a portion of the steel plate P containing one tooth T is illustrated.

Three oil holes 411, 412, and 413 are formed in the steel plate P from the inside to the outside of the radial D2. The length of the oil holes 411, 412, and 413 in the radial direction D2 is longer than that in the circumferential direction D3 perpendicular to the radial direction D2. Further, the stator S has a tooth T projecting toward the inside of the radial D2, the outermost oil hole 413 of the radial D2 is formed on the outside in the radial D2 from the tooth T, the oil hole 411 other than the oil hole 413, the oil hole 412 is formed in the tooth T.

The oil passage 4 is formed by overlapping the oil holes 411, 412, and 413 formed in the plurality of steel plates P in the stacking direction D1. To the oil passage 4, the coolant oil 5 is introduced in order from the oil hole 411 located inside the radial D2. That is, in the order of the oil hole 411, the oil hole 412, and the oil hole 413, the cooling oil 5 is introduced.

Returning to FIG. 1, the oil passage 4 has an offset collision wall 41 formed by the oil holes 411, 412 and 413 overlapping shifted in a direction perpendicular to the stacking direction D1. In FIG. 1, although an example is disclosed in which the offset collision wall 41 is formed by overlapping the oil holes 411, 412, and 413 displaced in the radial D2, it is desired that the offset collision wall 41, the oil hole 411, 412, 413 is formed by overlapping displaced in the circumferential direction D3. The offset collision wall 41 is formed, for example, every time 30 laminated steel sheet P, but the number of the offset collision wall 41 is not particularly limited, it can be set to one or more arbitrary number.

Further, the oil passage 4 has a turn portion 42 for folding back in the stacking directionally D1. The oil passage 4 has two turn portions 42, and discharges the cooling oil 5 introduced from one end of the stacking direction D1 from the other end of the stacking direction D1.

In FIG. 2, the temperature is illustrated by the shading of the hatching so that the hatching of the portion where the temperature is high becomes thin. By introducing the cooling oil 5 in this order from the oil hole 411 located inside the radial D2 where the temperature of the steel plate P is high, it is possible to efficiently cool the portion where the temperature of the steel plate P is high with the cooling oil 5 having a low temperature.

Figure 3:
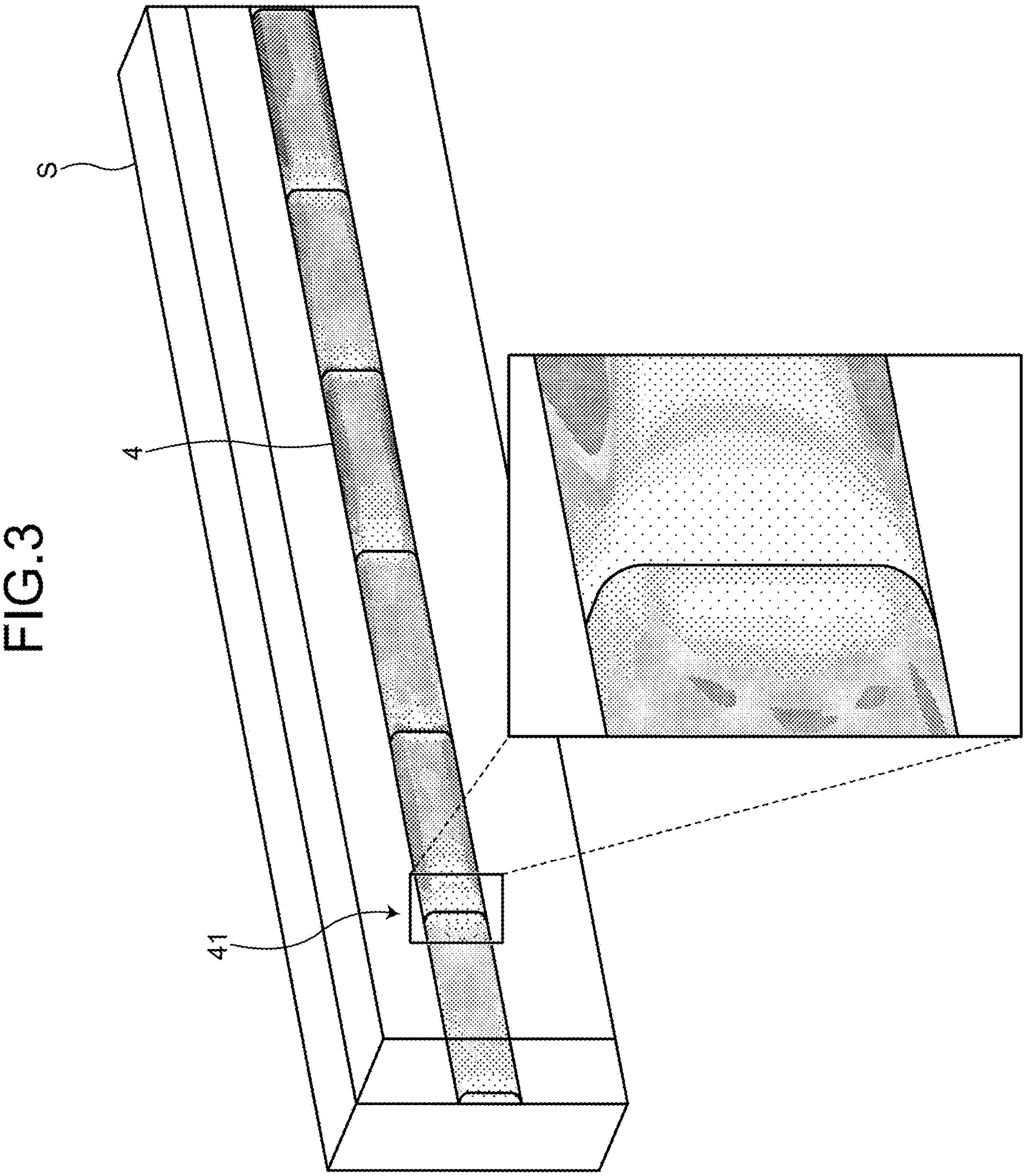
FIG. 3 is a diagram illustrating a heat transfer coefficient of the oil passage.

FIG. 3 is a diagram illustrating a heat transfer coefficient of the oil passage. In FIG. 3, the heat transfer coefficient is illustrated with the shading of the hatching so that the hatching at the portion where the heat transfer coefficient is high becomes thin. As illustrated in FIG. 3, the heat transfer coefficient is increased in the vicinity of the offset collision wall 41. This is because the cooling oil 5 flowing through the oil passage 4 collides with the offset collision wall 41, turbulence is generated by the flow downstream is disturbed, the heat transfer coefficient between the cooling oil 5 and the wall surface of the stator S is improved.

Figure 4:
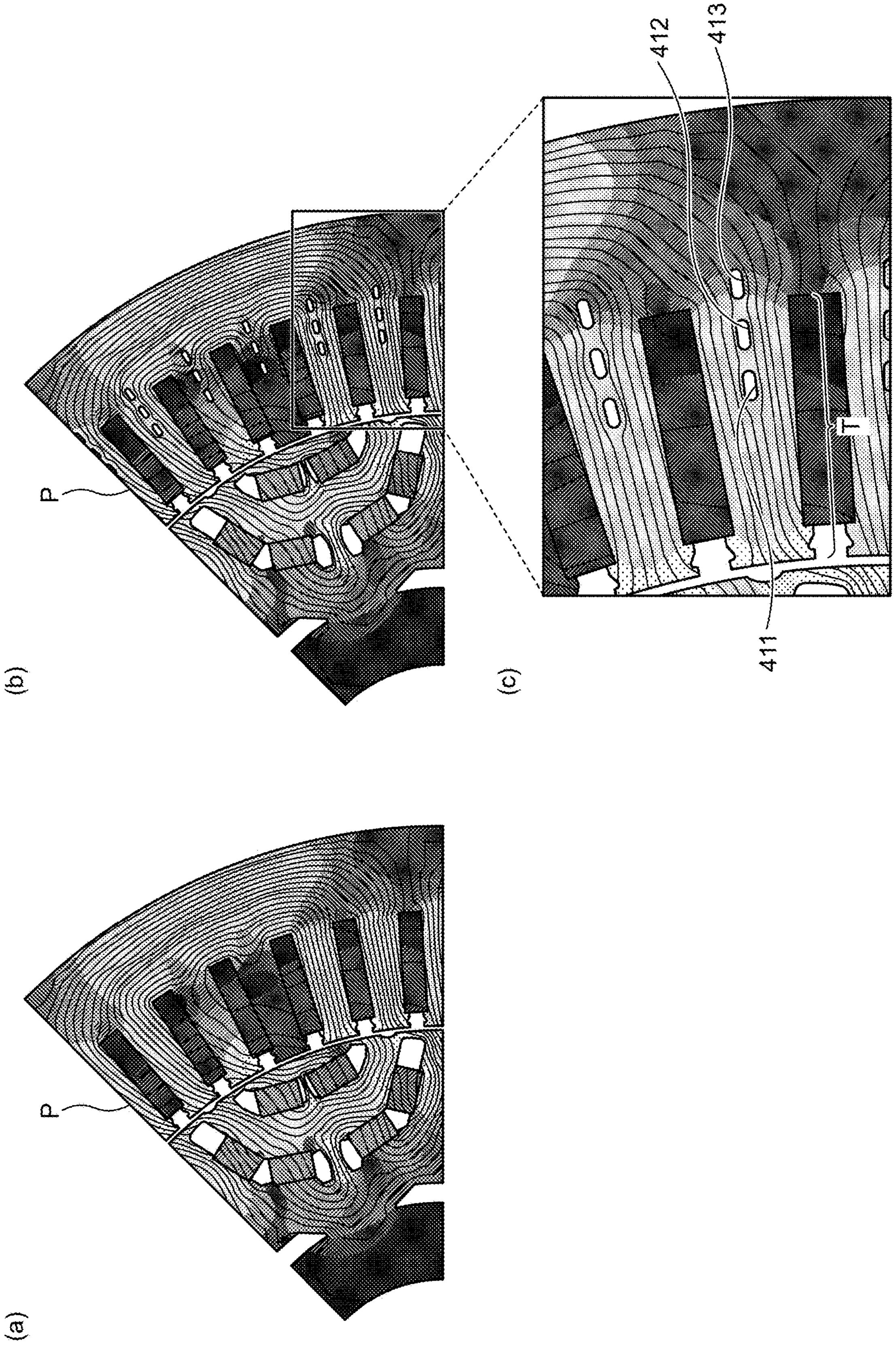
FIG. 4 is a diagram illustrating a magnetic flux density of the steel plate.

FIG. 4 is a diagram illustrating the magnetic flux density of the steel plate. In FIG. 4, the magnetic flux density is illustrated in a manner that the hatching of the portion where the magnetic flux density is high becomes thin in the shading of hatching, and also, the magnetic field lines are illustrated. As illustrated in FIG. 4, in the case where the oil holes 411, 412, and 413 are not formed in the steel plate P as illustrated in part (a) in FIG. 4, and the case where the oil holes 411, 412, and 413 are formed in the steel plate P illustrated in part (b) in FIG. 4, it can be seen that there is no large difference in the distribution of the magnetic flux density.

Further, in part (c) in FIG. 4, there is illustrated a portion enlarged view of part (b) in FIG. 4, the outermost oil hole 413 of the radial D2 is formed on the outer side in the radial D2 from the teeth T, the oil hole 411 other than the oil hole 413, and the oil hole 412 is formed in the teeth T. With such a configuration, it is possible to reduce the change in magnetic flux density by forming the oil holes 411, 412, and 413 in the steel plate P.

According to the motor cooling device 1 described above, since the oil passage 4 has an offset collision wall 41, the cooling performance is improved with a low-pressure loss even a small flow rate, it is possible to provide a small and low-cost motor cooling device 1.

Further, the offset colliding wall 41 is formed by the oil holes 411, 412, and 413 overlapping and shifted in the circumferential direction D3. Specifically, by stacking alternately two types of steel plates P having different shapes for every 30 sheets, it is possible to form an offset collision wall 41. Therefore, it is possible to suppress the increase in the type of steel sheet P having different shapes, and it is possible to suppress an increase in labor and cost. Incidentally, by using as a different steel sheet P shape by inverting one type of steel sheet P, it may be further suppressed that the type of steel sheet P having a different shape is increased.

Further, the oil holes 411, 412, and 413 in the radial D2 is longer than that in the circumferential direction D3, the offset colliding wall 41, the oil holes 411, 412 and 413 are formed by overlapping shifted in the circumferential direction D3. As a result, the offset collision wall 41 is formed on the long side of the oil holes 411, 412 and 413, therefore, it is possible to increase the area of the offset collision wall 41, and it is possible to suppress an increase in pressure loss together with the cooling performance is improved.

Further, three oil holes 411, 412, and 413 are formed in the steel plate P along the radial D2. As a result, since the oil holes 411, 412, 413 along the magnetic field lines of the teeth T are formed side by side, it is possible to increase the magnetoresistance, and it is possible to suppress a decrease in the motor torque caused thereby.

Further, the oil passage 4 has a turn portion 42 for folding back in the stacking directionally D1. As a result, even when the cooling oil 5 has the same flow rate and flow velocity, the area of the wall surface of the oil passage 4 in contact can be increased, thereby improving the cooling performance. Furthermore, since the turbulence is generated even in the turn portion 42, the heat transfer coefficient is improved, thereby improving the cooling performance.

Further, the oil passage 4 discharges the coolant oil 5 introduced from one end of the stacking direction D1 from the other end of the stacking direction D1. As a result, since the inlet and outlet of the cooling oil 5 is located on the opposite end face, it does not interfere with the coil end, and it is possible to prevent the interference with each other.

Further, the oil passage 4, the coolant oil 5 is introduced in order from the oil hole 411 located inside the radial D2. As a result, it is possible to efficiently cool the inner portion of the teeth T, where the temperature of the steel plate P is high with a low temperature cooling oil 5.

Further, the outermost oil hole 413 of the radial D2 is formed on the outer side in the radial D2 from the teeth T, the oil hole 411 other than the oil hole 413, the oil hole 412 is formed in the teeth T. As a result, it is possible to suppress the reduction of the magnetic path and the reduction of the motor torque caused thereby.

Further, before the inlet of the oil passage 4, the inlet-side coil end cooling oil hole for cooling the coil end may be formed. Thus, with cooling the coil end, it is possible to improve the insulation of the coil end.

Further, after the outlet of the oil passage 4, the outlet-side coil end cooling oil hole for cooling the coil end may be formed. Thus, with cooling the coil end, it is possible to improve the insulation of the coil end.

Further effects and variations can be readily derived by one skilled in the art. Thus, the broader aspects of the present disclosure are not limited to the particular details and representative embodiments described and represented above. Accordingly, various modifications are possible without departing from the spirit or scope of the overall concept of the present disclosure defined by the appended claims and their equivalents.

According to the present disclosure, it is possible to realize a motor cooling device capable of improving the cooling performance.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor cooling device comprising:

an oil passage, provided in a stator formed by laminating a plurality of steel plates, serving as a conduit for a cooling oil, wherein the oil passage is formed by a plurality of oil holes, which are formed in the steel plates and are overlapping with each other in a laminating direction of the steel plates, the oil passage is formed by an offset collision wall formed by shifting the oil holes in a direction orthogonal to the laminating direction and overlapping the oil holes, in each of the steel plates, a plurality of the oil holes are formed aligned along a radial direction having a rotational axis of a rotor as a center, and turn portions are formed in the radial direction where the oil passage folds back in the laminating direction.

2. The motor cooling device according to claim 1, wherein a length of the oil hole in the radial direction having the rotational axis of the rotor as the center is longer than a length of the oil hole in a circumferential direction perpendicular to the radial direction, and the offset collision wall is formed by shifting the oil holes in the circumferential direction and overlapping the oil holes.

3. The motor cooling device according to claim 1, wherein in the steel plates, there are three oil holes formed along the radial direction, the oil passage has two of the turn portions, so that the cooling oil is introduced into one end and is discharged from another end in the laminating direction.

4. The motor cooling device according to claim 1, wherein the cooling oil is introduced in order from the oil hole located inside the radial direction.

5. The motor cooling device according to claim 1, wherein the stator includes teeth projecting toward an inner side in the radial direction, and the oil hole radially outermost is formed on an outer side of the teeth in the radial direction, the oil holes other than the radially outermost oil hole are formed in the teeth.

6. The motor cooling device according to claim 1, wherein in each of the steel plates, the oil hole closest to the rotational axis of the rotor forms an inlet portion of oil passage.

* * * * *